(12) United States Patent
Shankar et al.

(10) Patent No.: US 9,146,769 B1
(45) Date of Patent: Sep. 29, 2015

(54) SYSTEMS AND METHODS FOR COPYING A SOURCE MACHINE TO A TARGET VIRTUAL MACHINE

(71) Applicants: Shiva Shankar, Bangalore (IN); Srikant Sreenivasan, Mumbai (IN)

(72) Inventors: Shiva Shankar, Bangalore (IN); Srikant Sreenivasan, Mumbai (IN)

( * ) Notice: Subject to any disclaimer, the term of this patent is extended or adjusted under 35 U.S.C. 154(b) by 0 days.

(21) Appl. No.: 14/677,632

(22) Filed: Apr. 2, 2015

(51) Int. Cl.
G06F 9/455 (2006.01)
H04L 29/08 (2006.01)
G06F 17/30 (2006.01)

(52) U.S. Cl.
CPC ...... *G06F 9/45558* (2013.01); *G06F 17/30194* (2013.01); *H04L 67/06* (2013.01); *G06F 2009/45595* (2013.01)

(58) Field of Classification Search
CPC .......... G06F 9/45558; G06F 17/30194; G06F 2009/45595; H04L 67/06
USPC ........................ 718/1; 717/168–178; 709/203
See application file for complete search history.

(56) References Cited

U.S. PATENT DOCUMENTS

| | | | |
|---|---|---|---|
| 7,203,944 B1 * | 4/2007 | van Rietschote et al. | 718/1 |
| 7,213,065 B2 | 5/2007 | Watt | |
| 7,257,811 B2 * | 8/2007 | Hunt et al. | 718/1 |
| 7,356,679 B1 | 4/2008 | Le et al. | |
| 7,484,208 B1 | 1/2009 | Nelson | |
| 7,640,292 B1 | 12/2009 | Smoot | |
| 7,716,667 B2 * | 5/2010 | van Rietschote et al. | 718/1 |
| 8,037,032 B2 | 10/2011 | Pershin et al. | |
| 8,151,263 B1 | 4/2012 | Venkitachalam et al. | |
| 8,239,646 B2 | 8/2012 | Colbert et al. | |
| 8,316,125 B2 | 11/2012 | Dehaan | |
| 8,359,593 B2 * | 1/2013 | Golosovker et al. | 718/1 |
| 8,370,560 B2 | 2/2013 | Dow et al. | |
| 8,380,661 B2 | 2/2013 | Richards et al. | |
| 8,429,647 B2 | 4/2013 | Zhou et al. | |
| 8,489,699 B2 | 7/2013 | Goggin et al. | |
| 8,498,997 B2 | 7/2013 | Murase | |
| 8,751,738 B2 | 6/2014 | Green et al. | |
| 9,015,709 B2 * | 4/2015 | Voccio | 718/1 |
| 2005/0268298 A1 * | 12/2005 | Hunt et al. | 718/1 |
| 2007/0130566 A1 * | 6/2007 | van Rietschote et al. | 718/1 |
| 2009/0265706 A1 * | 10/2009 | Golosovker et al. | 718/1 |

(Continued)

OTHER PUBLICATIONS

CloudVelox, Clone Oracle Ecommerce Stack into AWS for Cloud DR and Dev/Test, Case Study, Jun. 7, 2014, Santa Clara, California.

(Continued)

*Primary Examiner* — Qing Chen
(74) *Attorney, Agent, or Firm* — Foley & Lardner LLP; John D. Lanza

(57) ABSTRACT

Systems and methods of the present disclosure can facilitate generating virtual machines (VMs). The system can include an orchestrator executing on a server, an agent, a hypervisor, a transfer VM, and a target VM different from the transfer VM. The orchestrator can transmit the agent to be installed on a source machine to generate a snapshot and transmit a current state of a first filesystem of the source machine to the orchestrator, which can use it to configure a second filesystem on the hypervisor and initiate the transfer VM on the hypervisor using a default filesystem independent of the first and second filesystem configurations. The orchestrator can instruct the agent to transfer the snapshot to the transfer VM to write to the second filesystem, update the second filesystem to be operative to start an operating system, and create the target VM configured to launch from the second filesystem.

30 Claims, 11 Drawing Sheets

(56) References Cited

U.S. PATENT DOCUMENTS

| | | | |
|---|---|---|---|
| 2010/0082922 A1 | 4/2010 | George et al. | |
| 2010/0107163 A1 | 4/2010 | Lee | |
| 2011/0071983 A1 | 3/2011 | Murase | |
| 2011/0302577 A1* | 12/2011 | Reuther et al. | 718/1 |
| 2012/0054731 A1 | 3/2012 | Aravamudan et al. | |
| 2012/0233282 A1 | 9/2012 | Voccio et al. | |
| 2012/0233611 A1* | 9/2012 | Voccio | 718/1 |
| 2013/0166504 A1 | 6/2013 | Varkhedi et al. | |
| 2013/0290542 A1 | 10/2013 | Watt et al. | |
| 2014/0149591 A1 | 5/2014 | Bhattacharya et al. | |

OTHER PUBLICATIONS

Krueger, John, vSphere 5.1 Enhanced vMotion, slides from VMware Learning presentation on YouTube video site, Feb. 8, 2013, Palo Alto, California.

Levinka, Maria, How to: Move a VMware VM from one host to another Without VMware vMotion, Veeam Blog, Dec. 18, 2013, Baar, Switzerland.

Racemi, Loppex Case Study, Jan. 27, 2014, Atlanta, Georgia.

Veeam Software AG, Support pages for Quick Migration, captured from support web site, Apr. 22, 2014, Baar, Switzerland.

VMware Inc. and River Meadow Software, Inc., The Value of Simple, Automated and Customizable Cloud Migration, Aug. 14, 2013, Palo Alto, California.

VMware Inc., vMotion: Virtual Machine Live Migration, product data sheet, captured from company web site Nov. 4, 2014, Palo Alto, California.

Watrous, Brian, Migration Hot and Cold Migration—vMotion, slides from presentation on VMware company web site, captured Nov. 4, 2014, Palo Alto, California.

\* cited by examiner

SYSTEMS AND METHODS FOR COPYING A SOURCE MACHINE TO A TARGET VIRTUAL MACHINE

FIELD OF THE DISCLOSURE

The present disclosure generally relates to managing virtual machines. More specifically, the present disclosure relates to generating a target virtual machine from a source machine.

BACKGROUND

A virtual machine can be created from a source machine, using a network. The source machine may be a physical machine or a virtual machine. Challenges may arise when copying the source machine to the virtual machine.

SUMMARY OF THE DISCLOSURE

Systems and methods of the present disclosure allow for the creation of a virtual machine as a copy of a source machine without interfering with the source machine, while correctly capturing the source machine and maintaining data security during the copying operation. For example, a system of the present disclosure may clone a source machine to a target machine by transferring the file system data of the source machine using a data format independent of the hypervisor directly to the target virtual machine without using intermediate storage of data.

It can be useful to make a copy of a computing device. For example, the copy may serve as a backup device that can be used if the original device becomes unusable for some reason. In another example, the copy may be useful as a test environment in which experiments may be conducted without concern for losing the state of the device. In still another example, using multiple copies of a device can share a workload between the copies and facilitate scaling the operation of the device to a larger capacity. In still another example, a specific device configuration can be copied to sell as a pre-configured device to multiple customers.

It can be useful to have the copy be a virtual machine. For example, cloud services can provide virtual machines that can be convenient to manage remotely with less concern for specific hardware costs and configurations. In addition, cloud services can facilitate creating and destroying virtual machines with relative ease, which may facilitate scaling to larger numbers of machines with short notice and billing that may be based on usage. These cloud services may be able to provide more efficient use of physical hardware by using the same hardware for a second virtual machine when a first virtual machine is temporarily idle. In another example, single virtual machines may be simpler to manage and may be able to run on multiple operating systems with relative ease.

The source machine for a copy may be a physical machine, or it may be another virtual machine. The source machine for a copy may run any of a number of different operating systems, and may also use any of a number of different filesystem implementations to access storage. The source machine for a copy may use more than one filesystem implementation to access different volumes in its storage.

The target virtual machine may be managed by a hypervisor. The hypervisor may be any of a number of different hypervisor implementations. The hypervisor may support an application programming interface (API) that can allow it to be accessed externally by another computing device, and different hypervisor implementations may have different APIs for controlling them.

It may be challenging to copy source machines to target virtual machines in an environment with multiple operating systems and multiple filesystem implementations on the source machines, and with multiple hypervisor implementations controlling the target virtual machines. The present disclosure describes systems and methods for copying a source machine to a target virtual machine that can work well in an environment that can allow multiple operating systems and multiple filesystem implementations on the source machine, and multiple hypervisor implementations controlling the target virtual machine.

It may be challenging to maintain data security while copying a source machine to a target virtual machine. For example, if the copy involves copying the filesystem data of the source machine to a third intermediate data storage, the data may be vulnerable to eavesdropping for some period of time. In addition, the provider of the intermediate data storage may fail to properly delete the filesystem data after the copy is complete, either maliciously or accidentally. The present disclosure describes systems and methods for copying a source machine to a target virtual machine that can transfer the filesystem data of the source machine directly to the target virtual machine without using intermediate data storage.

At least one aspect of the present disclosure is directed to a system for generating virtual machines via a computer network. In some embodiments, the system includes an orchestrator executing on a processor of a server that transmits an agent for installation on a source machine, the agent configured to generate a snapshot of the source machine. An interface of the orchestrator receives, from the agent installed on the source machine, a current state of a first filesystem of the source machine, the first filesystem having a first configuration. The orchestrator configures, on a hypervisor executing on a host machine, a second filesystem with a second configuration based on the first configuration. The orchestrator initiates, on the hypervisor, a transfer virtual machine using a default filesystem independent of the first configuration and the second configuration. The orchestrator instructs the agent to directly transfer the snapshot of the source machine to the transfer virtual machine, the transfer virtual machine configured to write the second filesystem using the snapshot. The orchestrator updates the second filesystem written by the transfer virtual machine to be operative to start an operating system. The orchestrator creates a target virtual machine configured to launch the operating system from the second filesystem, the target virtual machine different from the transfer virtual machine.

In some embodiments, the server is further configured to receive, by the transfer virtual machine responsive to the initiation, the snapshot from the agent. The server can be configured to write, by the transfer virtual machine responsive to the reception, the second filesystem using the snapshot. The server can be configured to update, by the transfer virtual machine, the second filesystem to be operative to start the operating system. The server can be configured to launch, by the transfer virtual machine, the operating system from the second filesystem.

In some embodiments, the server is further configured to initialize, by the hypervisor, the default filesystem from a stored image. The server can be configured to start, by the hypervisor, the transfer virtual machine from the default filesystem, the transfer virtual machine configured to execute a second operating system, different from the operating system.

In some embodiments, the server is further configured to receive, by the agent from the orchestrator, a network address of the transfer virtual machine and a token. The server can be configured to create, by the agent, using the network address of the transfer virtual machine, a network connection to the transfer virtual machine. The server can be configured to transmit, by the agent to the transfer virtual machine, using the network connection, the token to authenticate the network connection to the transfer virtual machine. The server can be configured to accept, by the transfer virtual machine responsive to the token, the network connection. The server can be configured to use, by the agent, the network connection to directly transfer the snapshot of the source machine to the transfer virtual machine.

In some embodiments, the server is further configured to destroy, responsive to the transfer virtual machine writing the second filesystem, the transfer virtual machine. The server can be configured to destroy, after the transfer virtual machine is destroyed, the default filesystem.

In some embodiments, the target virtual machine is further created on the hypervisor.

In some embodiments, the source machine is further selected from one of a physical source machine, or a virtual source machine.

In some embodiments, the server is further configured to receive, by the orchestrator from the source machine, an indication of the operating system. The server can be configured to select, by the orchestrator responsive to the reception, the agent from a plurality of source agents based on the indication of the operating system. The server can be configured to transmit, by the orchestrator to the source machine responsive to the selection, the agent.

In some embodiments, the server is further configured to receive, by the orchestrator from the hypervisor, an indication of a characteristic of the hypervisor. The server can be configured to select, by the orchestrator responsive to the reception, an interface between the orchestrator and the hypervisor based on the characteristic. The server can be configured to establish, based on the interface, a communication between the orchestrator and the hypervisor.

In some embodiments, the server is further configured to start, by the target virtual machine, the operating system from the second filesystem.

In some embodiments, the server is further configured to update the second filesystem by performing at least one of changing a networking configuration to remove a static network address, changing a first device driver to a second device driver operative to communicate with an environment of the target virtual machine, or changing a first configuration of the second filesystem to a second configuration of the second filesystem, the first configuration causing an error during a starting of the target virtual machine.

In some embodiments, the server is further configured to receive, by the orchestrator via a user interface, an option. The server can be configured to apply, by the orchestrator, the option. The option can further include at least one of a schedule operative to control the time of the receiving of the current state, a count operative to control a number of copies of the target virtual machine and the second filesystem, a subset operative to control a selection of the first filesystem included in the second filesystem, or a name operative to identify an image of the second filesystem created by the hypervisor.

In some embodiments, the server is further configured to determine a type of installation for the agent, the type of installation including at least one of a manual installation process, an automated process initiated by the orchestrator, or an automated process initiated by a management server responsive to a signal from the orchestrator. The server can be configured to install the agent in accordance with the type of installation.

In some embodiments, the server is further configured to record, by the agent, a timestamp corresponding to a snapshot of the first filesystem. The server can be configured to create, by the agent, a list of shadow blocks that are initially empty. The server can be configured to start, by the agent, a shadowing process operative to: determine, responsive to a modification of a block in the first filesystem, an absence of the block in the list of shadow blocks, copy, responsive to the determination, the block to a new shadow block, and add, responsive to the copying, the new shadow block to the list of shadow blocks.

In some embodiments, the server is further configured to execute, by the source machine, an application on the operating system.

Another aspect of the present disclosure is directed to a method of generating virtual machines via a computer network. The method includes a server and an orchestrator executing on the server via the computer network. The method includes the orchestrator transmitting an agent for installation on a source machine, the agent configured to generate a snapshot of the source machine. The method includes the orchestrator receiving, from the agent installed on the source machine, a current state of a first filesystem of the source machine, the first filesystem having a first configuration. The method includes the orchestrator configuring, on a hypervisor executing on a host machine, a second filesystem with a second configuration based on the first configuration. The method includes the orchestrator initiating, on the hypervisor, a transfer virtual machine using a default filesystem independent of the first configuration and the second configuration. The method includes the orchestrator instructing the agent to directly transfer the snapshot of the source machine to the transfer virtual machine, the transfer virtual machine configured to write the second filesystem using the snapshot. The method includes the orchestrator updating the second filesystem written by the transfer virtual machine to be operative to start an operating system. The method includes the orchestrator creating a target virtual machine configured to launch the operating system from the second filesystem, the target virtual machine different from the transfer virtual machine.

Yet another aspect of the present disclosure is directed to a non-transitory computer readable medium storing instructions that, when executed by one or more processors, facilitate generating virtual machines via a computer network. The instructions include instructions to transmit an agent for installation on a source machine, the agent configured to generate a snapshot of the source machine. The instructions include instructions to receive, from the agent installed on the source machine, a current state of a first filesystem of the source machine, the first filesystem having a first configuration. The instructions include instructions to configure, on a hypervisor executing on a host machine, a second filesystem with a second configuration based on the first configuration. The instructions include instructions to initiate, on the hypervisor, a transfer virtual machine using a default filesystem independent of the first configuration and the second configuration. The instructions include instructions to instruct the agent to directly transfer the snapshot of the source machine to the transfer virtual machine, the transfer virtual machine configured to write the second filesystem using the snapshot. The instructions include instructions to update the second filesystem written by the transfer virtual machine to be operative to start an operating system. The instructions include instructions to create a target virtual machine configured to launch the operating system from the second filesystem, the target virtual machine different from the transfer virtual machine.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
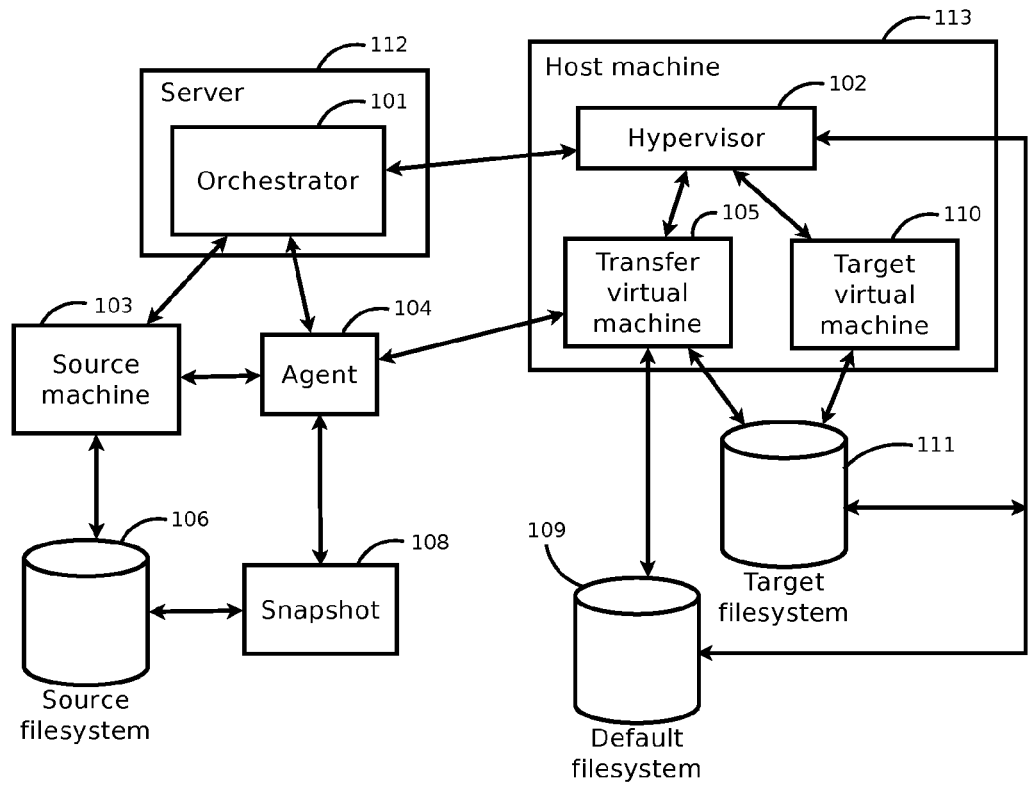
FIG. 1 is an illustrative block diagram of an embodiment of a system for copying a source machine to a target virtual machine.

Systems and methods of the present disclosure can facilitate copying a source machine to a target virtual machine via a computer network. The system can include an orchestrator, which can run on one or more processors of a server, and can manage the overall process of copying. The system can include an agent, which can run on one or more processors of the source machine, and can be designed to run on the operating system of the source machine. The agent can manage operations that are required by the source machine in the process of copying. The system can include a hypervisor, which can run on one or more processors of a host machine, and can manage operations on virtual machines responsive to signals from the orchestrator. The system can include a transfer virtual machine, which can run in the environment of the hypervisor, and can manage the creation of the copied target filesystem for the target virtual machine.

The transfer virtual machine can operate with a default filesystem as its system disk. The operating system on the default filesystem may not be the same operating system as on the source machine, target virtual machine, server, or host machine. As a result, the same default filesystem can be used to copy multiple types of operating systems from the source machine to the target virtual machine. The same default filesystem can also operate with multiple different types of hypervisors running on multiple different types of host machines. As a result, it may be simpler to create and test a default filesystem that can operate in several different environments. The default filesystem can be initialized or configured to contain the software, utilities, and drivers used by the transfer virtual machine to perform a copy. The default file system can be a "lightweight" system with a minimal set of software needed for the functions of the transfer virtual machine. This may facilitate storing and copying the default filesystem, and may reduce the impact of the transfer virtual machine on the resources of the hypervisor, such as memory, CPU utilization, and so on.

The agent can be installed and run on the source machine. In some embodiments, the installation can be a manual process. In some embodiments, the orchestrator can do the installation. In some embodiments, the orchestrator can manage the installation using a management system that may be set up for the source machine.

The agent can contact the orchestrator. As a result, the source machine may appear in a user interface for the orchestrator, as part of a list of machines that can be available for copying. The agent can also report the configuration of the filesystem attached to the source machine, for example, the number of volumes, the name of each volume, the size of each volume, the filesystem implementation used for each volume, and so on.

The orchestrator can generate a user interface that receives, from a user, a selection of a source machine for copying and one or more cloud services for the target. The user interface may provide options for the copy, such as a schedule for starting the operation, a number of copies to create, an optional creation of a hypervisor image at the cloud service, a selection of a subset of the filesystem on the source machine to copy, and so on. The orchestrator may receive, via the user interface, a selection from a user (e.g., at a computing device using an input such as a keyboard, mouse, touch interface, gesture input, or audio input) of a control to initiate the copying.

The orchestrator can use the application programming interface (API) of the cloud service to select a host machine and signal the hypervisor on the host machine to create a virtual target filesystem that can match the configuration of the filesystem on the source machine. The orchestrator can also use the hypervisor to create a default filesystem for use with the transfer virtual machine. The orchestrator can use the hypervisor to create the transfer virtual machine, attach the target filesystem to the transfer virtual machine, and start the transfer virtual machine from the default filesystem.

The orchestrator can signal the agent with addressing and authentication information for the transfer virtual machine. This signal can be an indication to the agent to start the copy. The agent can take a snapshot of the filesystem on the source machine. Initiating the snapshot can record a timestamp, create a list of shadow blocks that is initially empty, and start a shadowing process in which modifying a block in the filesystem can check if a shadow copy of the block is in the list, and if no shadow copy exists, create a shadow copy of the block and add it to the list. There may be support in the operating system on the source machine for creating and maintaining snapshots in this way. Once the snapshot has been initiated, the agent can start copying data from the snapshot directly to a receiver running on the transfer virtual machine, at the block level, one block at a time.

The transfer virtual machine can write a block image of the filesystem from the source machine onto the target filesystem. It should be noted that this can be done with no particular knowledge of the structure of the filesystem or operating system; it can be a direct binary copy. The agent can signal both the transfer virtual machine and the orchestrator upon completion of this process, and the agent can terminate the snapshot, which may free resources used by the list of shadow blocks and the shadowing process.

The transfer virtual machine can mount the target filesystem, using a filesystem driver of the appropriate type that has been included in the default filesystem, and can run scripts to adjust, modify, update or otherwise manipulate the target filesystem. For example, the transfer virtual machine may update the networking configuration to remove static addresses, changing device drivers to drivers that access the cloud environment, recovering from a power failure, and so on. The recovery from a power failure may facilitate starting the operating system the first time, because without the recovery, it could appear that the filesystem was associated with a live system that failed suddenly in operation, and starting the operating system with the target filesystem in that state could generate errors. The power failure recovery may involve closing open files, resetting process tables, and so on.

The orchestrator can use the hypervisor to shut down the transfer virtual machine, delete the transfer virtual machine, delete the default filesystem, create the target virtual machine, and attach the target virtual machine to the target filesystem. This may complete the copy. The orchestrator may also use the hypervisor to start the target virtual machine from the target filesystem.

Turning to the drawings, FIG. 1 is an illustrative block diagram of an embodiment of a system for copying a source machine to a target virtual machine. An orchestrator 101 can execute on a server 112. A hypervisor 102 can execute on a host machine 113. The orchestrator 101 can be used to install an agent 104 on a source machine 103 with a source filesystem 106. The orchestrator 101 can use the hypervisor 102 to create a transfer virtual machine 105 and a default filesystem 109 for the transfer virtual machine 105, then associate the transfer virtual machine 105 with the default filesystem 109 and start the transfer virtual machine 105. The agent 104 can transmit information about the configuration of the source filesystem 106 to the orchestrator 101, and the orchestrator 101 can use the hypervisor 102 to create a target filesystem 111 with the same configuration as the source filesystem 106, and to associate the transfer virtual machine 105 with the target filesystem 111. The orchestrator 101 can signal the agent 104, and can transmit addressing and authentication information for the transfer virtual machine 105 along with the signal. The agent 104 can establish a connection to the transfer virtual machine 105. The agent 104 can record a snapshot 108 of the source filesystem 106, which can represent the state of the source filesystem 106 at one moment in time. The agent 104 can transmit the contents of the source filesystem 106, based on the snapshot 108, to the transfer virtual machine 105. The transfer virtual machine 105 can use the information in this transfer to write the target filesystem 111 as a block-by-block copy of the source filesystem 106 at the time when the snapshot 108 was recorded. The transfer virtual machine 105 can update the target filesystem 111 with tweaks which may facilitate the target filesystem 111 to serve as a system disk in the environment of the hypervisor 102. The orchestrator 101 can use the hypervisor 102 to delete the transfer virtual machine 105 and the default filesystem 109, create a target virtual machine 110 which may have the same processor configuration as the source machine 103, and associate the target virtual machine 110 with the target filesystem 111. As a result, the target virtual machine 110 can be a copy of the source machine 103 at the time when the snapshot 108 was recorded, and can be prepared to run in the environment of the hypervisor 102. The orchestrator 101 may use the hypervisor 102 to start the target virtual machine 110.

The default filesystem 109 can be initialized to allow the transfer virtual machine 105 to start and run an operating system. The operating system on the default filesystem 109 may not be the same operating system as on the source filesystem 106 and the target filesystem 111. As a result, the same default filesystem 109 can be used to copy multiple types of operating systems for the source filesystem 106 and the target filesystem 111. The same default filesystem 109 can also operate with multiple different types of hypervisor 102 running on multiple different types of host machine 113. As a result, it may be simpler to create and test a default filesystem 109 that can operate in several different environments. The default filesystem 109 can be initialized to contain the software, utilities, and drivers needed to implement the functions described here for the transfer virtual machine 105. The default filesystem 109 can be configured as a "lightweight" system with a minimal set of software needed for the functions of the transfer virtual machine 105, which may facilitate storing and copying the default filesystem 109, and may reduce the impact of the transfer virtual machine 105 on the resources of the hypervisor 102, such as memory, CPU utilization, and so on.

The orchestrator 101 may be a server, or may be running on one or more processors of a server. They hypervisor 102 may be a server, may be running on one or more processors of a server, or may be running on one or more processors of a host machine 113 that may include components or functionality of a server. The one or more servers associated with the orchestrator 101, source machine 103, hypervisor 102, server 112, host machine 113, transfer virtual machine 105, or target virtual machine 110 do not need to be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node. In one embodiment, the server may be referred to as a cloud.

The orchestrator 101, source machine 103, hypervisor 102, server 112, host machine 113, transfer virtual machine 105, and target virtual machine 110 may be communicatively coupled using a computer network. The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include one or more of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

The system and its components, such as an orchestrator 101, a source machine 103, a hypervisor 102, a server 112, a host machine 113, a transfer virtual machine 105, and a target virtual machine 110, may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid state device, magnetic disk or optical disk, can be coupled to the bus for persistently storing information and instructions.

The system and its components, such as an orchestrator 101, a source machine 103, a hypervisor 102, a server 112, a host machine 113, a transfer virtual machine 105, and a target virtual machine 110, may include, e.g., computing devices, desktop computers, laptop computers, notebook computers, mobile or portable computing devices, tablet computers, smartphones, personal digital assistants, or any other computing device.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In some embodiments, hard-wired circuitry may be used in place of or in combination with software instructions to effect illustrative embodiments. Thus, embodiments are not limited to any specific combination of hardware circuitry and software. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 2:
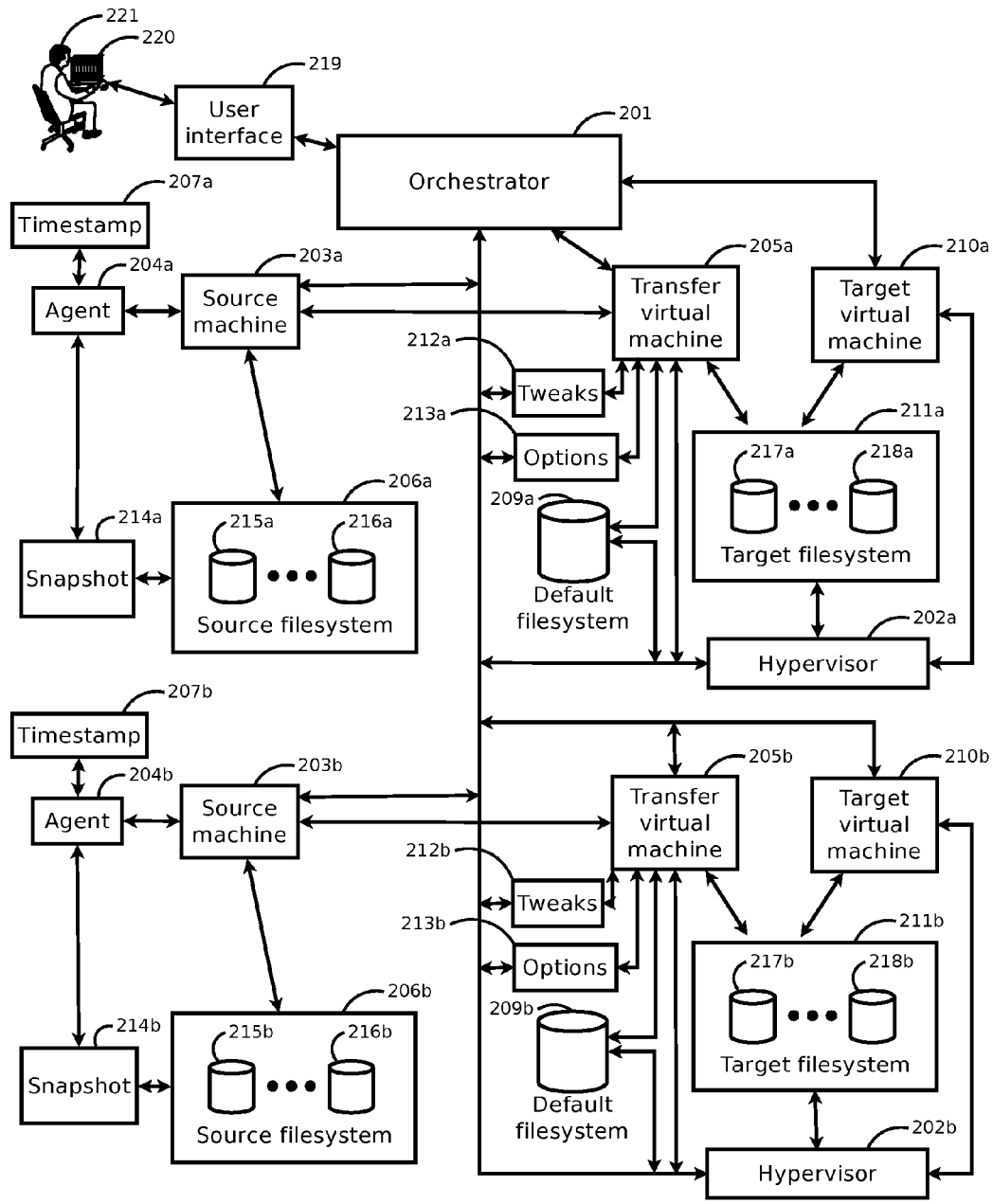
FIG. 2 is an illustrative block diagram of an embodiment of a system for copying a source machine to a target virtual machine.

FIG. 2 is an illustrative block diagram of an embodiment of a system for copying a source machine to a target virtual machine. An orchestrator 201 can be used to install an agent 204a on a source machine 203a with a source filesystem 206a. A user 221 can use a computing device 220 to interact with a user interface 219 to initiate a copy of the source machine 203a into the environment of a hypervisor 202a. The user interface 219 can also be used to indicate a set of options 213a which may be applied to the copy. The orchestrator 201 can use the hypervisor 202a to create a transfer virtual machine 205a and a default filesystem 209a for the transfer virtual machine 205a, and associate the transfer virtual machine 205a with the default filesystem 209a and start the transfer virtual machine 205a. The default filesystem 209a can be created from a pre-configured image that may be designed to facilitate the operations described here with respect to the transfer virtual machine 205a. The agent 204a can transmit information about the configuration of the source filesystem 206a to the orchestrator 201, which may include information about the volumes 215a-216a included in the source filesystem 206a, and the orchestrator 201 can use the hypervisor 202a to create a target filesystem 211a with the same configuration as the source filesystem 206a, which may include volumes 217a-218a with the same configuration as volumes 215a-216a, and to associate the transfer virtual machine 205a with the target filesystem 211a. The orchestrator 201 can signal the agent 204a, and can transmit addressing and authentication information for the transfer virtual machine 205a along with the signal. The agent 204a can establish a connection to the transfer virtual machine 205a. The agent 204a can initiate a snapshot 214a of the source filesystem 206a, which may record a timestamp 207a and begin to keep a list of changes to the source filesystem 206a, along with a record of the data in the source filesystem 206a prior to being changed, in the snapshot 214a. The agent 204a can transmit the snapshot 214a of the source filesystem 206a to the transfer virtual machine 205a. The transfer virtual machine 205a can use the information in this transfer to write the target filesystem 211a as a block-by-block copy of the source filesystem 206a at the time indicated by the timestamp 207a. The transfer of information can happen directly from the source machine 203a to the transfer virtual machine 205a, without any intermediate steps, which may facilitate the security of the data on the source filesystem 206a and the reliability of the transfer operation. The transfer virtual machine 205a can apply the options 213a to the setup and execution of the block-by-block copy. The transfer virtual machine 205a can update the target filesystem 211a with a set of tweaks 212a which may facilitate the target filesystem 211a to serve as a system disk in the environment of the hypervisor 202a. The orchestrator 201 can use the hypervisor 202a to delete the transfer virtual machine 205a and the default filesystem 209a, create a target virtual machine 210a which may have the same processor configuration as the source machine 203a, and associate the target virtual machine 210a with the target filesystem 211a. As a result, the target virtual machine 210a can be a copy of the source machine 203a at the time recorded in the timestamp 207a, running in the environment of the hypervisor 202a. The orchestrator 201 may use the hypervisor 202a to start the target virtual machine 210a.

The orchestrator 201 can be used to install an agent 204b on another source machine 203b with a source filesystem 206b. The source machine 203b may be running a different operating system from the source machine 203a, and the agent 204b may be different from the agent 204a in order to support a different operating system. The user 221 can use the computing device 220 to interact with the user interface 219 to initiate a copy of the source machine 203b into the environment of a hypervisor 202b. The hypervisor 202b may be a different hypervisor from the hypervisor 202a, and the interface between the orchestrator 201 and the hypervisor 202b may be different from the interface between the orchestrator 201 and the hypervisor 202a in order to support a different hypervisor. The user interface 219 can also be used to indicate a set of options 213b which may be applied to the copy. The orchestrator 201 can use the hypervisor 202b to create a transfer virtual machine 205b and a default filesystem 209b for the transfer virtual machine 205b, and associate the transfer virtual machine 205b with the default filesystem 209b and start the transfer virtual machine 205b. Even if the operating system of the source machine 203b is different from the operating system of the source machine 203a, and the hypervisor 202b is different from the hypervisor 202a, the image on the default filesystem 209b can be the same as the image on the default filesystem 209a. The default filesystem 209b can be created from a pre-configured image that may be designed to facilitate the operations described here with respect to the transfer virtual machine 205b. The agent 204b can transmit information about the configuration of the source filesystem 206b to the orchestrator 201, which may include information about the volumes 215b-216b included in the source filesystem 206b, and the orchestrator 201 can use the hypervisor 202b to create a target filesystem 211b with the same configuration as the source filesystem 206b, which may include volumes 217b-218b with the same configuration as volumes 215b-216b, and to associate the transfer virtual machine 205b with the target filesystem 211b. The orchestrator 201 can signal the agent 204b, and can transmit addressing and authentication information for the transfer virtual machine 205b along with the signal. The agent 204b can establish a connection to the transfer virtual machine 205b. The agent 204b can initiate a snapshot 214b of the source filesystem 206b, which may record a timestamp 207b and begin to keep a list of changes to the source filesystem 206b, along with a record of the data in the source filesystem 206b prior to being changed, in a snapshot 214b. The agent 204b can transmit the snapshot 214b of the source filesystem 206b to the transfer virtual machine 205b. The transfer virtual machine 205b can use the information in this transfer to write the target filesystem 211b as a block-by-block copy of the source filesystem 206b at the time indicated by the timestamp 207b. The transfer of information can happen directly from the source machine 203b to the transfer virtual machine 205b, without any intermediate steps, which may facilitate the security of the data on the source filesystem 206b and the reliability of the transfer operation. The transfer virtual machine 205b can apply the options 213b to the setup and execution of the block-by-block copy. The transfer virtual machine 205b can update the target filesystem 211b with a set of tweaks 212b which may facilitate the target filesystem 211b to serve as a system disk in the environment of the hypervisor 202b. The orchestrator 201 can use the hypervisor 202b to delete the transfer virtual machine 205b and the default filesystem 209b, create a target virtual machine 210b which may have the same processor configuration as the source machine 203b, and associate the target virtual machine 210b with the target filesystem 211b. As a result, the target virtual machine 210b can be a copy of the source machine 203b at the time recorded in the timestamp 207b, running in the environment of the hypervisor 202b. The orchestrator 201 may use the hypervisor 202b to start the target virtual machine 210b.

In some embodiments, the orchestrator 201 in FIG. 2 can include components or functionality of the orchestrator 101 as described with respect to FIG. 1. In some embodiments, the hypervisors 202a and 202b in FIG. 2 can include components or functionality of the hypervisor 102 as described with respect to FIG. 1. In some embodiments, the source machines 203a and 203b in FIG. 2 can include components or functionality of the source machine 103 as described with respect to FIG. 1. In some embodiments, the agents 204a and 204b in FIG. 2 can include components or functionality of the agent 104 as described with respect to FIG. 1. In some embodiments, the transfer virtual machines 205a and 205b in FIG. 2 can include components or functionality of the transfer virtual machine 105 as described with respect to FIG. 1. In some embodiments, the source filesystems 206a and 206b in FIG. 2 can include components or functionality of the source filesystem 106 as described with respect to FIG. 1. In some embodiments, the snapshots 214a and 214b in FIG. 2 can include components or functionality of the snapshot 108 as described with respect to FIG. 1. In some embodiments, the default filesystems 209a and 209b in FIG. 2 can include components or functionality of the default filesystem 109 as described with respect to FIG. 1. In some embodiments, the target virtual machines 210a and 210b in FIG. 2 can include components or functionality of the target virtual machine 110 as described with respect to FIG. 1. In some embodiments, the target filesystems 211a and 211b in FIG. 2 can include components or functionality of the target filesystem 111 as described with respect to FIG. 1.

Figure 3:
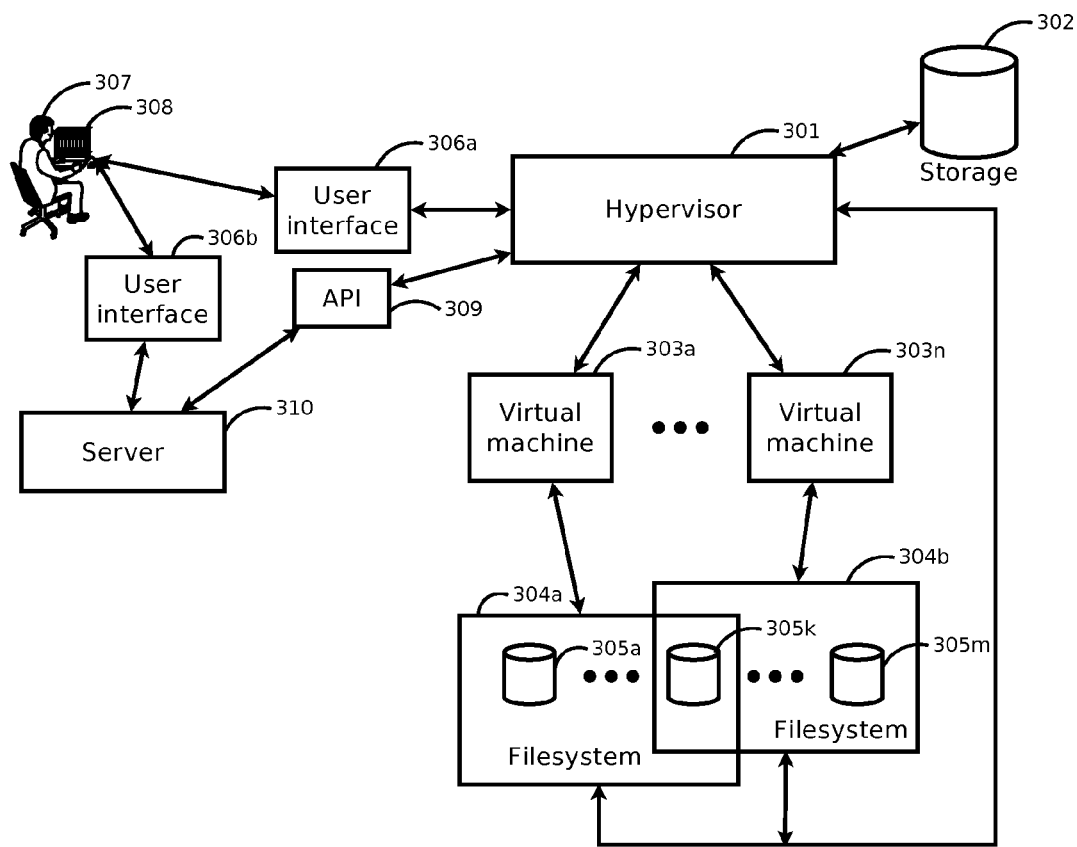
FIG. 3 is an illustrative block diagram of an embodiment of a hypervisor controlling multiple virtual machines with multiple filesystems.

FIG. 3 is an illustrative block diagram of an embodiment of a hypervisor controlling multiple virtual machines with multiple filesystems. A hypervisor 301 can create virtual machines 303a-303n and can create filesystems such as 304a and 304b. The hypervisor can use attached storage 302 to initialize data for the filesystems 304a-304b and to store configuration information about the virtual machines 303a-303n and filesystems 304a-304b. The filesystems 304a-304b can contain volumes 305a-305m, and the volumes can be partitioned among filesystems. In the example embodiment depicted in FIG. 3, volumes 305a-305k are part of filesystem 304a, and volumes 305k-305m are part of filesystem 304b. In this example, volume 305k is shared between multiple filesystems 304a-304b. The virtual machines 303a-303n may be running different operating systems, and may be different hardware configurations or processor types. An end user 307 can use a computing device 308 to control the hypervisor 301 through a user interface 306a. The end user 307 may also be able to use the computing device 308 to control a server 310 through a user interface 306b, and the server 310 may be able to control the hypervisor 301 through an application programming interface (API) 309.

In some embodiments, the hypervisor 301 in FIG. 3 can include components or functionality of the hypervisor 102 as described with respect to FIG. 1. In some embodiments, the virtual machines 303a-303n in FIG. 3 can include components or functionality of the transfer virtual machine 105 and the target virtual machine 110 as described with respect to FIG. 1. In some embodiments, the filesystems 304a-304b in FIG. 3 can include components or functionality of the target filesystem 111 as described with respect to FIG. 1. In some embodiments, the user 307 in FIG. 3 can include components or functionality of the user 221 as described with respect to FIG. 2. In some embodiments, the computing device 308 in FIG. 3 can include components or functionality of the computing device 220 as described with respect to FIG. 2. In some embodiments, the user interface 306a in FIG. 3 can include components or functionality of the user interface 219 as described with respect to FIG. 2.

Figure 4:
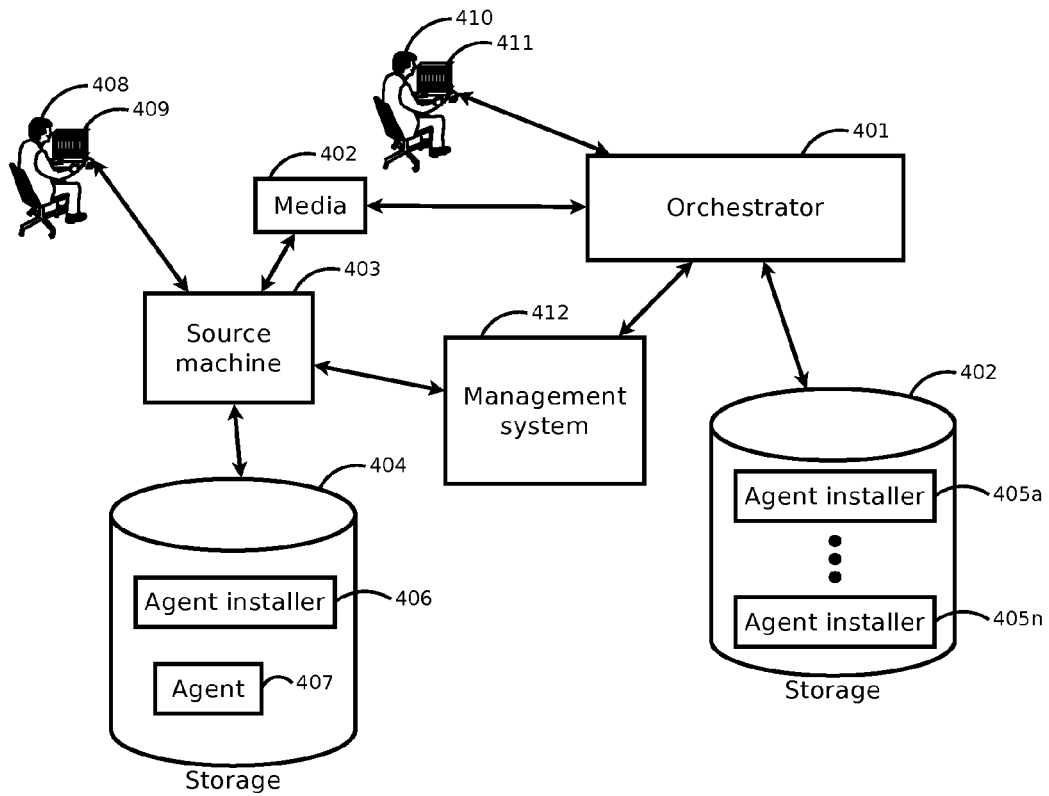
FIG. 4 is an illustrative block diagram of an embodiment of an installation of an agent.

FIG. 4 is an illustrative block diagram of an embodiment of an installation of an agent. The goal may be to install an agent 407 in storage 404 that is accessible by a source machine 403. In one embodiment, a user 408 may access media 402 from an orchestrator 401. The media 402 can contain an agent installer that the orchestrator 401 accesses from a selection of agent installers 405a-405n in storage 402. The selection of agent installer from 405a-405n may be based on the operating system that is running on the source machine 403. The media 402 may include one of a download, an email, a physical medium such as a CD-ROM, and so on. The end user 408 may use an interface device 409 to copy the correct agent installer 406 onto storage 404 for the source machine 403, and may execute the agent installer 406 on the source machine 403 in order to install the agent 407 on the storage 404 of the source machine 403. In another embodiment, a user 410 may use a computing device 411 to interface with the orchestrator 401 and cause the orchestrator 401 to initiate transferring an agent installer selected from 405a-405n from storage 402 on the orchestrator 401 to an agent installer 406 in storage 404 on the source machine 403, and executing the agent installer 406 on the source machine 403 in order to install the agent 407 on the storage 404 of the source machine 403. In one embodiment, the orchestrator 401 may use a management system 412 in order to complete the transfer of the agent installer 406 and the installation of the agent 407.

In some embodiments, the orchestrator 401 in FIG. 4 can include components or functionality of the orchestrator 101 as described with respect to FIG. 1. In some embodiments, the source machine 403 in FIG. 4 can include components or functionality of the source machine 103 as described with respect to FIG. 1. In some embodiments, the storage 404 in FIG. 4 can include components or functionality of the source filesystem 106 as described with respect to FIG. 1. In some embodiments, the users 408 and 410 in FIG. 4 can include components or functionality of the user 221 as described with respect to FIG. 2. In some embodiments, the interface device 409 and the computing device 411 in FIG. 4 can include components or functionality of the computing device 220 as described with respect to FIG. 2.

Figure 5:
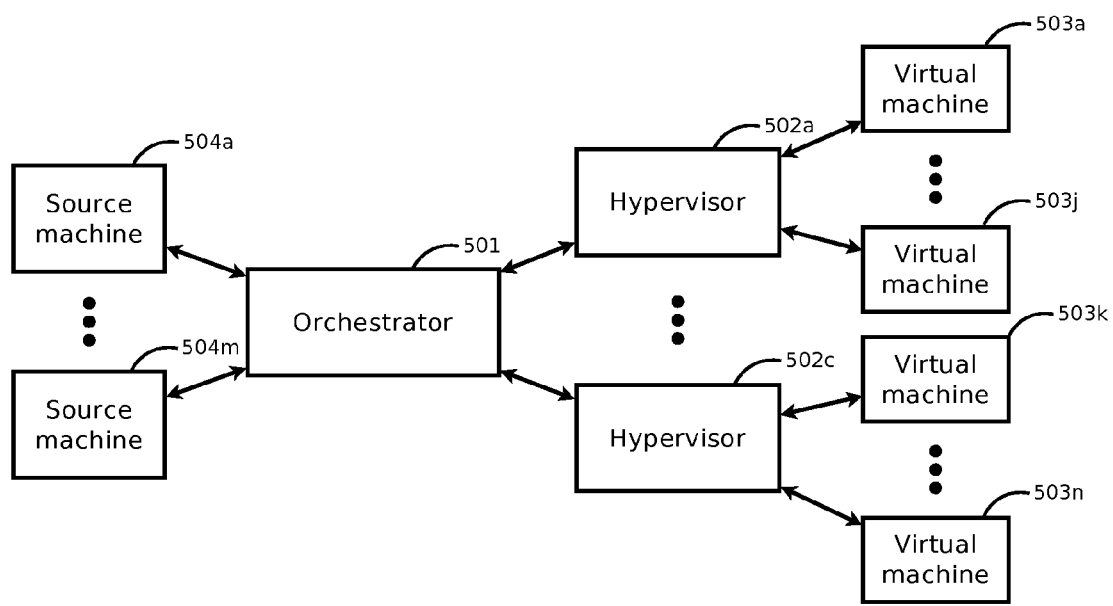
FIG. 5 is an illustrative block diagram of an embodiment of an orchestrator working with source machines having multiple operating systems and with multiple types of hypervisors.

FIG. 5 is an illustrative block diagram of an embodiment of an orchestrator working with source machines having multiple operating systems and with multiple types of hypervisors. An orchestrator 501 can support the use of multiple source machines 504a-504m as source machines for a copy. The source machines 504a-504m can have multiple different types of operating systems. The orchestrator 501 can support the use of multiple hypervisors 502a-502c as target hypervisors for a copy. The target hypervisors 502a-502c can be multiple different types of hypervisors. The hypervisors 502a-502c can mange multiple virtual machines 503a-503n. In the example embodiment depicted in FIG. 5, hypervisor 502a can manage virtual machines 503a-503j, and hypervisor 502c can manage 503k-503n. Virtual machines 503a-503n can have different hardware configurations and can run different operating systems.

In some embodiments, the orchestrator 501 in FIG. 5 can include components or functionality of the orchestrator 101 as described with respect to FIG. 1. In some embodiments, the hypervisors 502a-502c in FIG. 5 can include components or functionality of the hypervisor 102 as described with respect to FIG. 1. In some embodiments, the source machines 504a-504m in FIG. 5 can include components or functionality of the source machine 103 as described with respect to FIG. 1. In some embodiments, the virtual machines 503a-503n in FIG. 5 can include components or functionality of the transfer virtual machine 105 and the target virtual machine 110 as described with respect to FIG. 1.

Figure 6:
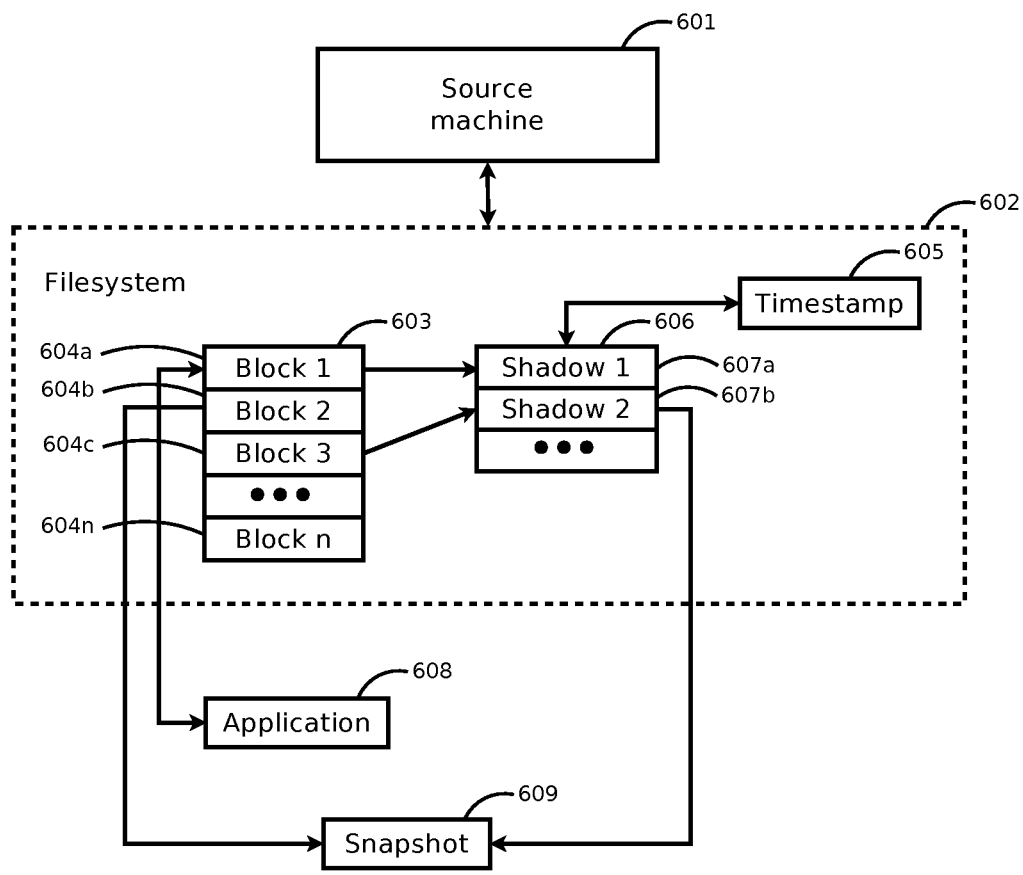
FIG. 6 is an illustrative block diagram of an embodiment of a snapshot of a filesystem.

FIG. 6 is an illustrative block diagram of an embodiment of a snapshot of a filesystem. A source machine 601 can initiate a snapshot 609 of a filesystem 602 by creating a timestamp 605 marking the time of the snapshot 609, and creating a shadow storage 606 associated with the timestamp 605. An application 608 can continue to access the blocks 604a-604n in the filesystem 602 normally, but if an application 608 writes a block such as 604a, the existing contents of the block 604a can be saved as a shadow block 607a before writing the new contents of the block 604a. It should be noted that if a block 604a has already been saved as a shadow block 607a, the contents of the block 604a may be overwritten without being saved as a shadow block. As a result, the size of the shadow storage 606 may be at most the size of the block storage 603. The snapshot 609 of the filesystem 602 at the time of the timestamp 605 can be reconstructed using the data in the block storage 603 and the shadow storage 606. In the example embodiment depicted in FIG. 6, the snapshot 609 can retrieve block 604c from the shadow block 607b since the data exists in the shadow storage 606, and the snapshot 609 can retrieve block 604b from the block storage 603 since no shadow storage 606 may be recorded for block 604b.

In some embodiments, the source machine 601 in FIG. 6 can include components or functionality of the source machine 103 as described with respect to FIG. 1. In some embodiments, the filesystem 602 in FIG. 6 can include components or functionality of the source filesystem 106 as described with respect to FIG. 1. In some embodiments, the timestamp 605 in FIG. 6 can include components or functionality of the timestamps 204a-204b as described with respect to FIG. 2. In some embodiments, the snapshot 609 in FIG. 6 can include components or functionality of the snapshot 108 as described with respect to FIG. 1.

Figure 7A:
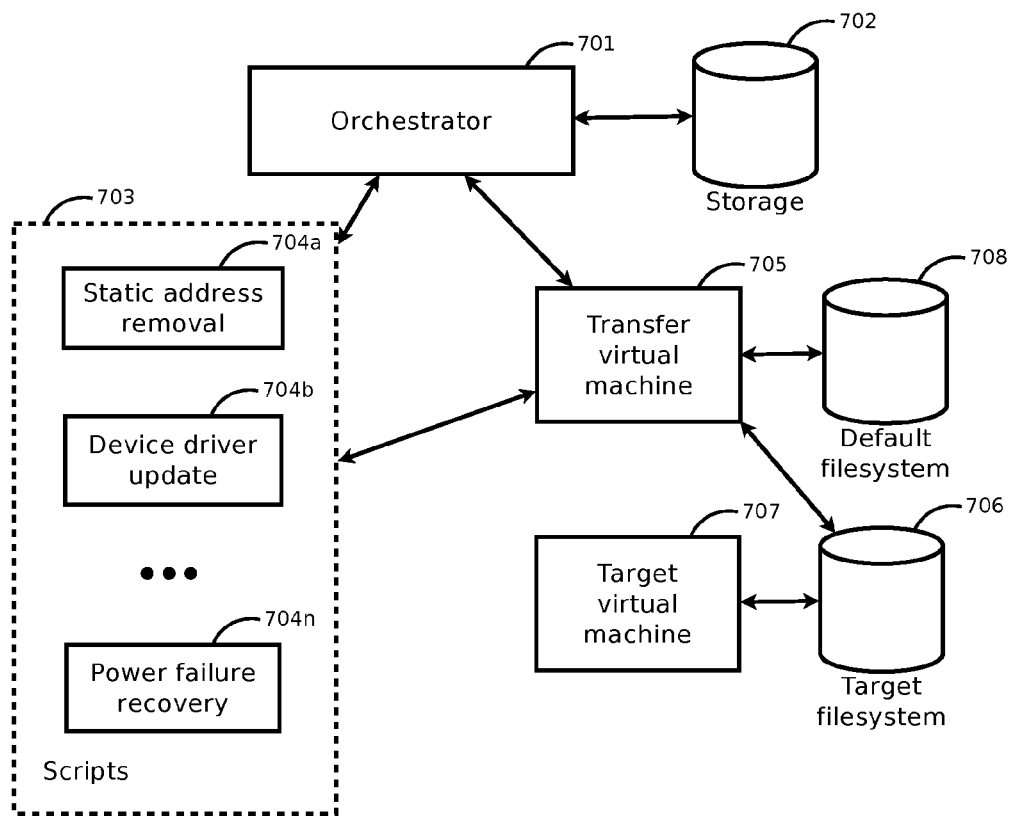
FIG. 7A is an illustrative block diagram of an embodiment of an orchestrator applying tweaks to a target filesystem.

FIG. 7A is an illustrative block diagram of an embodiment of an orchestrator applying tweaks to a target filesystem. An orchestrator 701 can retrieve tweaks 704a-704n from storage 702 as executable scripts 703. The orchestrator 701 can run the tweaks 704a-704n on the transfer virtual machine 705 in order to update the target filesystem 706. The transfer virtual machine 705 can be running with the default filesystem 708 as its system disk, which may allow it to update system configurations on the target filesystem 706 without interfering with the operation of the transfer virtual machine 705. Both the default filesystem 708 and the target filesystem 706 can be operative to start an operating system, and the two filesystems may not be operative to start the same operating system. The tweak 704a can update the network configuration in the target filesystem 706 to replace any reference to static network addresses with network addresses that can work correctly in the environment of the target virtual machine 707. In one embodiment, the replacement addresses can be static addresses in the subnet of the target virtual machine 707. In another embodiment, the replacement addresses can be dynamically allocated addresses. The tweak 704b can update the device drivers in the target filesystem 706 to replace any device drivers for hardware with device drivers that can function correctly in the virtualized hardware environment of the target virtual machine 707. The tweak 704b may retrieve replacement device drivers from storage 702. The tweak 704n can update the target filesystem 706 from a running state to a power-off state to facilitate starting the operating system from filesystem 706 without errors. In one embodiment, the tweak 704n can close open files in the filesystem 706. In another embodiment, the tweak 704n can reset process tables in the filesystem 706.

In some embodiments, the orchestrator 701 in FIG. 7A can include components or functionality of the orchestrator 101 as described with respect to FIG. 1. In some embodiments, the storage 702 in FIG. 7A can include components or functionality of the storage 402 as described with respect to FIG. 4. In some embodiments, the transfer virtual machine 705 in FIG. 7A can include components or functionality of the transfer virtual machine 105 as described with respect to FIG. 1. In some embodiments, the default filesystem 708 in FIG. 7A can include components or functionality of the default filesystem 109 as described with respect to FIG. 1. In some embodiments, the target filesystem 706 in FIG. 7A can include components or functionality of the target filesystem 111 as described with respect to FIG. 1. In some embodiments, the target virtual machine 707 in FIG. 7A can include components or functionality of the target virtual machine 110 as described with respect to FIG. 1. In some embodiments, the scripts 703 in FIG. 7A can include components or functionality of the tweaks 212a-212b as described with respect to FIG. 2.

Figure 7B:
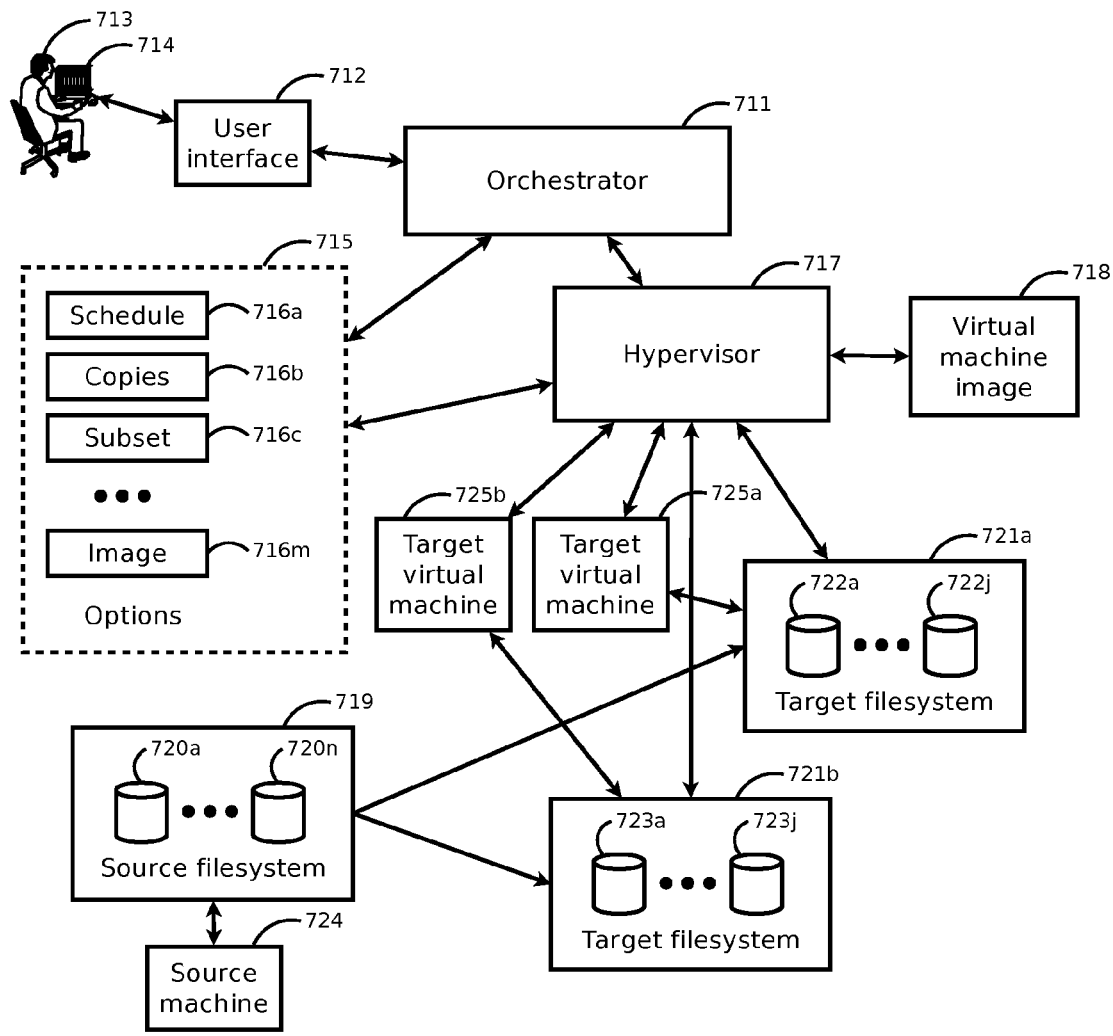
FIG. 7B is an illustrative block diagram of an embodiment of an orchestrator applying options on a copy from a source machine to a target virtual machine.

FIG. 7B is an illustrative block diagram of an embodiment of an orchestrator applying options on a copy from a source machine to a target virtual machine. A user 713 can use a computing device 714 to interact with an orchestrator 711 through a user interface 712 to configure a set of options 715 made up of individual options 716a-716m. The orchestrator 711 can use the options 715 to control the operation of copying a source machine 724 to target virtual machines 725a-725b. The option 716a can control the timing of the copy. In one embodiment, option 716a can delay the copy until a time when users of the source machine 724 may be less likely to be impacted. The option 716b can indicate that the orchestrator 711 can manage the creation of more than one copy. In the embodiment depicted in FIG. 7B, the orchestrator 711 can use the hypervisor 717 to create two target virtual machines 725a and 725b, and two target filesystems 721a and 721b, using the process described with respect to FIG. 1. The orchestrator 711 can use the hypervisor 717 to associate target virtual machine 725a with target filesystem 721a and target virtual machine 725b with target filesystem 721b. The option 716c can indicate that the orchestrator 711 can create the target filesystems 721a-721b using a subset of the volumes in the source filesystem 719. In the embodiment depicted in FIG. 7B, the orchestrator can create the target filesystem 721a with the subset 722a-722j of the volumes 720a-720n in the source filesystem 719, and can create the target filesystem 721b with the subset 723a-723j of the volumes 720a-720n in the source filesystem 719. The option 716m can indicate that after the copy, the orchestrator 711 can use the hypervisor 717 to create a virtual machine image 718 of the copied target virtual machine 725a and target filesystem 721a. The virtual machine image 718 can be in a format that is specific to the hypervisor 717, and may be used to facilitate rapid deployment of another copy of the target virtual machine 725a and target filesystem 721a by the hypervisor 717.

In some embodiments, the orchestrator 711 in FIG. 7B can include components or functionality of the orchestrator 101 as described with respect to FIG. 1. In some embodiments, the user 713 in FIG. 7B can include components or functionality of the user 221 as described with respect to FIG. 2. In some embodiments, the computing device 714 in FIG. 7B can include components or functionality of the computing device 220 as described with respect to FIG. 2. In some embodiments, the user interface 712 in FIG. 7B can include components or functionality of the user interface 219 as described with respect to FIG. 2. In some embodiments, the hypervisor 717 in FIG. 7B can include components or functionality of the hypervisor 102 as described with respect to FIG. 1. In some embodiments, the options 715 in FIG. 7B can include components or functionality of the options 213a-213b as described with respect to FIG. 2. In some embodiments, the target virtual machines 725a-725b in FIG. 7B can include components or functionality of the target virtual machine 110 as described with respect to FIG. 1. In some embodiments, the target filesystems 721a-721b in FIG. 7B can include components or functionality of the target filesystem 111 as described with respect to FIG. 1. In some embodiments, the source machine 724 in FIG. 7B can include components or functionality of the source machine 103 as described with respect to FIG. 1. In some embodiments, the source filesystem 719 in FIG. 7B can include components or functionality of the source filesystem 106 as described with respect to FIG. 1. In some embodiments, the source volumes 720a-720n in FIG. 7B can include components or functionality of the source volumes 215a-216a and 215b-216b as described with respect to FIG. 2. In some embodiments, the target volumes 722a-722j and 723a-723j in FIG. 7B can include components or functionality of the target volumes 217a-218a and 217b-218b as described with respect to FIG. 2.

Figure 8:
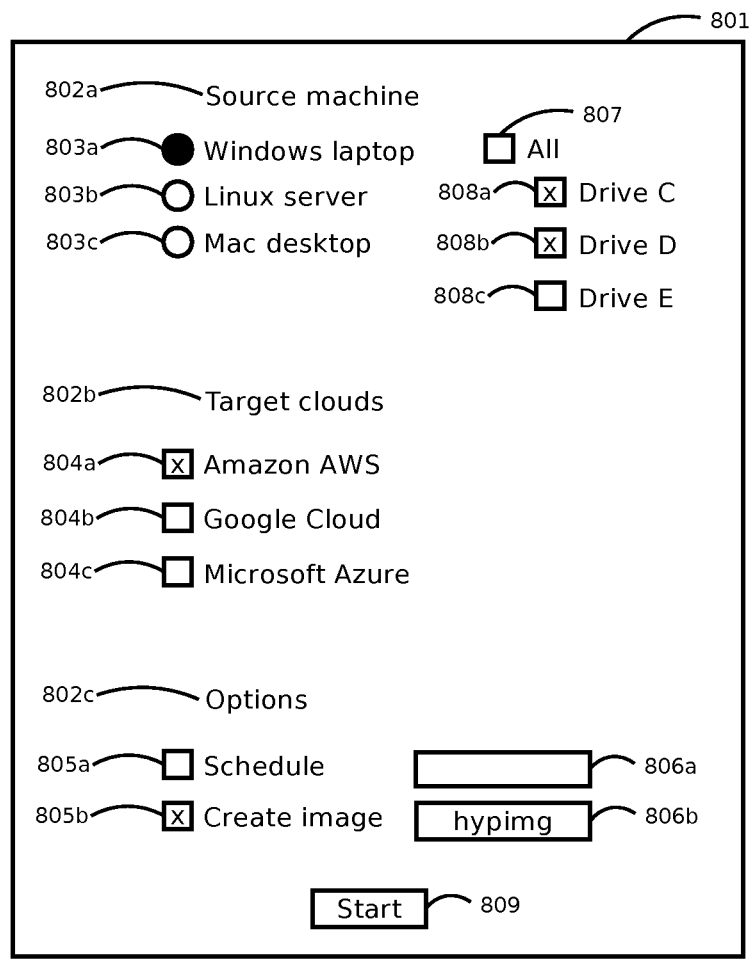
FIG. 8 is an illustrative example of an embodiment of a user interface for controlling a copy from a source machine to a target virtual machine.

FIG. 8 is an illustrative example of an embodiment of a user interface for controlling a copy from a source machine to a target virtual machine. The user interface 801 can be organized into three sections 802a-802c. Section 802a can list the machines with agents that have contacted the orchestrator, and allow selecting one machine as the source for a copy. In the embodiment depicted in FIG. 8, the three machines listed are 803a named "Windows laptop", 803b named "Linux server", and 803c named "Mac desktop", and 803a is selected as the source for the copy. Once a source is selected, the details of the source filesystem can be displayed to the right of the list of machines, and the subset of the filesystem to be copied can be selected. The entire filesystem may be selected with the "All" selection 807, or individual volumes 808a-808c may be selected. In the embodiment depicted in FIG. 8, the volumes "Drive C" 808a and "Drive D" 808b have been selected, and the volume "Drive E" 808c has not been selected. Section 802b can list the cloud services that are available to serve as targets for the copy. In the embodiment depicted in FIG. 8, the three cloud services listed are "Amazon AWS" 804a, "Google Cloud" 804b, and "Microsoft Azure" 804c, and "Amazon AWS" 804a is selected. It should be noted that more than one cloud service may be selected as a target, as described with respect to FIG. 2. Section 802c can list the options available for the copy. Option 805a can allow setting a schedule 806a for the copy, and option 805b can allow creating a hypervisor image from the copy and giving the image a name 806b. In the embodiment depicted in FIG. 8, the schedule option 805a is not selected, so the copy may start immediately, and the option 805b to create an image is selected, so a hypervisor image of the copy may be created with the name "hypimg" in 806b. The "Start" button 809 can be selected to begin the copy.

In some embodiments, the user interface 801 in FIG. 8 can include components or functionality of the user interface 219 as described with respect to FIG. 2.

Figure 9:
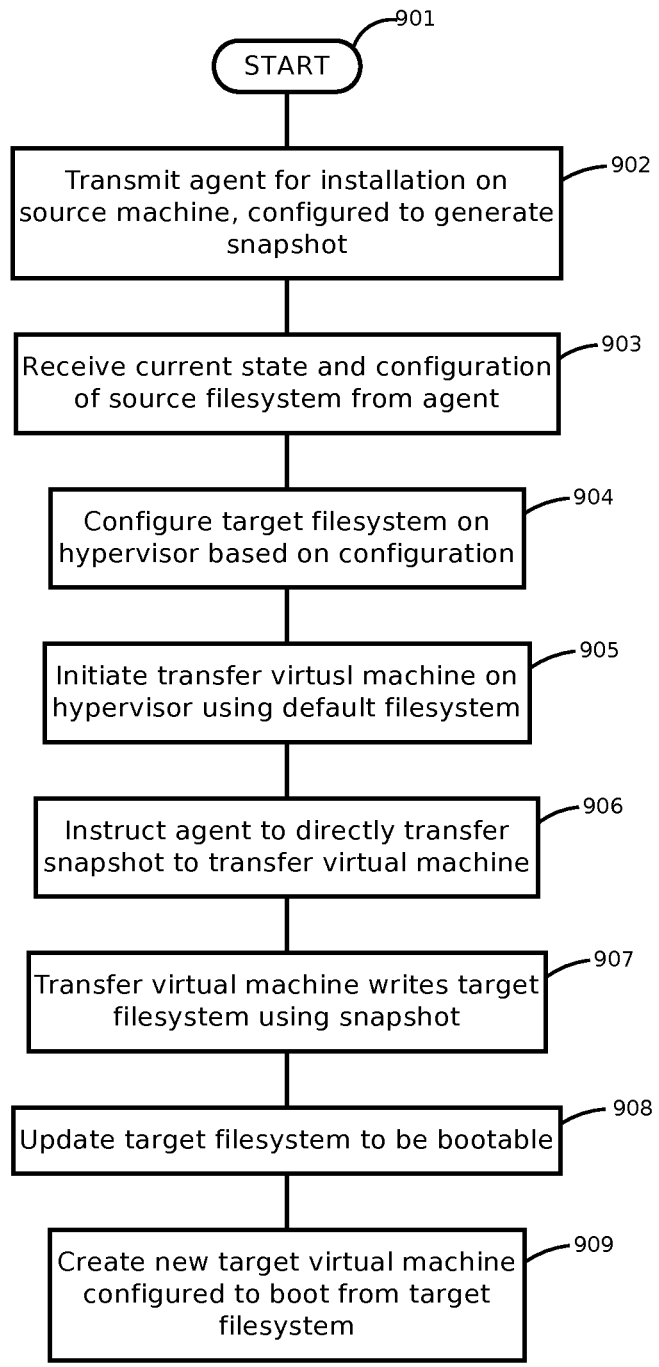
FIG. 9 is an illustrative flowchart depicting one embodiment of a method of copying a source machine to a target virtual machine.

FIG. 9 is an illustrative flowchart depicting one embodiment of a method of copying a source machine to a target virtual machine. The method 901 can include transmitting an agent for installation on a source machine, the agent configured to generate a snapshot of the source machine (902). The method 901 can include receiving a current state and configuration of the source filesystem from the agent (903). The method 901 can include configuring the target filesystem on a hypervisor based on the configuration received from the agent (904). The method 901 can include initiating a transfer virtual machine on the hypervisor using a default filesystem (905). The method 901 can include instructing the agent to directly transfer the snapshot to the transfer virtual machine (906). The method 901 can include using the transfer virtual machine to write the target filesystem using the snapshot (907). The method 901 can include updating the target filesystem to be bootable (908). The method 901 can include creating a new target virtual machine configured to boot from the target filesystem (909).

Figure 10:
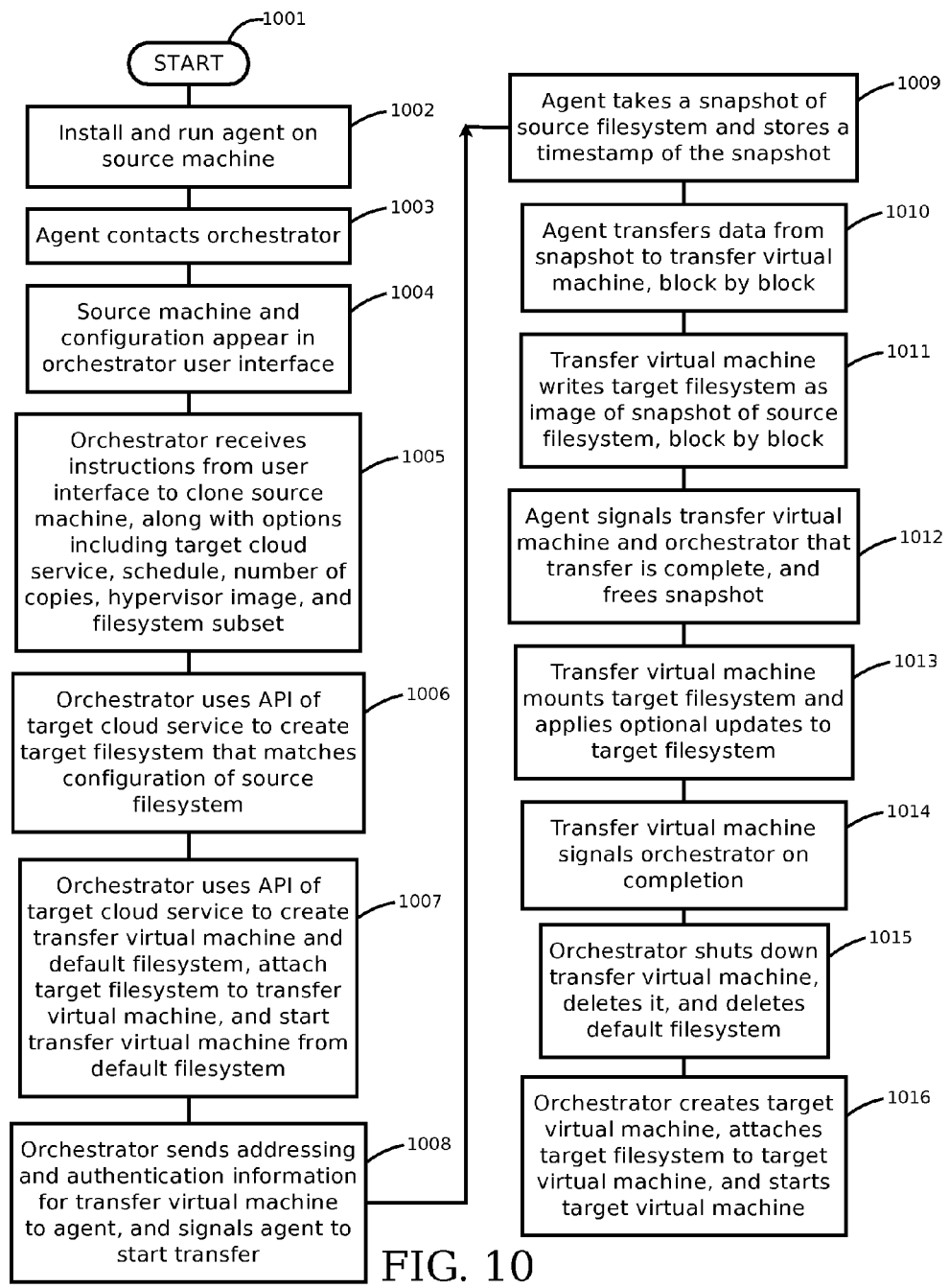
FIG. 10 is an illustrative flowchart depicting one embodiment of a method of copying a source machine to a target virtual machine.

FIG. 10 is an illustrative flowchart depicting one embodiment of a method of copying a source machine to a target virtual machine. The method 1001 can include installing and running an agent on a source machine (1002). The method 1001 can include the agent contacting an orchestrator (1003). The method 1001 can include displaying a source machine and a configuration in an orchestrator user interface (1004). The method 1001 can include the orchestrator receiving instructions from the user interface to copy a selected source machine, along with the options for the copy, which can include a target cloud service, a schedule, a number of copies, a hypervisor image, and a filesystem subset (1005). The method 1001 can include the orchestrator using the API of the target cloud service to create a target filesystem that matches the configuration of the source filesystem (1006). The method 1001 can include the orchestrator using the API of target cloud service to create a transfer virtual machine and a default filesystem, attach the target filesystem to the transfer virtual machine, and start the transfer virtual machine from the default filesystem (1007). The method 1001 can include the orchestrator sending addressing and authentication information for the transfer virtual machine to the agent, and signaling the agent to start a transfer (1008). The method 1001 can include the agent taking a snapshot of the source filesystem and storing a timestamp of the snapshot (1009). The method 1001 can include the agent transferring data from the snapshot to the transfer virtual machine, block by block (1010). The method 1001 can include the transfer virtual machine writing the target filesystem as an image of the snapshot of the source filesystem, block by block (1011). The method 1001 can include the agent signaling the transfer virtual machine and the orchestrator that the transfer is complete, and freeing the snapshot (1012). The method 1001 can include the transfer virtual machine mounting the target filesystem and applying optional updates to the target filesystem (1013). The method 1001 can include the transfer virtual machine signaling the orchestrator upon completion of the updates (1014). The method 1001 can include the orchestrator shutting down the transfer virtual machine, deleting the transfer virtual machine, and deleting the default filesystem (1015). The method 1001 can include the orchestrator creating a target virtual machine, attaching the target filesystem to the target virtual machine, and starting the target virtual machine (1016).

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of generating virtual machines via a computer network, comprising:
    transmitting, by an orchestrator executing on a server via the computer network, an agent for installation on a source machine, wherein the agent is configured to generate a snapshot of the source machine;
    receiving, by the orchestrator from the agent installed on the source machine, a current state of a first filesystem of the source machine, wherein the first filesystem includes a first configuration;
    configuring, by the orchestrator on a hypervisor executing on a host machine, a second filesystem with a second configuration based on the first configuration;
    initiating, by the orchestrator on the hypervisor executing on the host machine, a transfer virtual machine using a default filesystem independent of the first configuration and the second configuration;
    instructing, by the orchestrator on the hypervisor executing on the host machine, the agent to directly transfer the snapshot of the source machine to the transfer virtual machine, wherein the transfer virtual machine is configured to write the second filesystem using the snapshot of the source machine;
    updating, by the orchestrator on the hypervisor executing on the host machine, the second filesystem written by the transfer virtual machine using the snapshot of the source machine to be operative to start a first operating system; and
    creating, by the orchestrator on the hypervisor executing on the host machine, a target virtual machine configured to launch the first operating system from the second filesystem, wherein the target virtual machine is different from the transfer virtual machine.

2. The method of claim 1, further comprising:
    receiving, by the transfer virtual machine responsive to the initiating, the snapshot of the source machine from the agent;
    writing, by the transfer virtual machine responsive to the receiving of the snapshot of the source machine from the agent, the second filesystem using the snapshot of the source machine;
    updating, by the transfer virtual machine, the second filesystem to be operative to start the first operating system; and
    launching, by the transfer virtual machine, the first operating system from the second filesystem.

3. The method of claim 1, further comprising:
    initializing, by the hypervisor executing on the host machine, the default filesystem from a stored image; and
    starting, by the hypervisor executing on the host machine, the transfer virtual machine from the default filesystem, wherein the transfer virtual machine is configured to execute a second operating system different from the first operating system.

4. The method of claim 1, further comprising:
    receiving, by the agent from the orchestrator, a network address of the transfer virtual machine and a token;
    creating, by the agent from the orchestrator, using the network address of the transfer virtual machine, a network connection to the transfer virtual machine;
    transmitting, by the agent from the orchestrator to the transfer virtual machine, using the network connection to the transfer virtual machine, the token to authenticate the network connection to the transfer virtual machine;
    accepting, by the transfer virtual machine responsive to transmitting the token, the network connection to the transfer virtual machine; and
    using, by the agent from the orchestrator, the network connection to the transfer virtual machine to directly transfer the snapshot of the source machine to the transfer virtual machine.

5. The method of claim 1, further comprising:
    destroying, responsive to the transfer virtual machine writing the second filesystem, the transfer virtual machine; and
    destroying, after the transfer virtual machine is destroyed, the default filesystem.

6. The method of claim 1, wherein:
    the target virtual machine is created on the hypervisor executing on the host machine.

7. The method of claim 1, wherein:
    the source machine is selected from one of:
        a physical source machine; or
        a virtual source machine.

8. The method of claim 1, further comprising:
    receiving, by the orchestrator from the source machine, an indication of the first operating system;

selecting, by the orchestrator from the source machine responsive to the receiving of the indication of the first operating system, the agent from a plurality of source agents based on the indication of the first operating system; and transmitting, by the orchestrator from the source machine responsive to the selecting, the agent to the source machine.

9. The method of claim 1, further comprising:
receiving, by the orchestrator from the hypervisor, an indication of a characteristic of the hypervisor;
selecting, by the orchestrator from the hypervisor responsive to the receiving of the indication of the characteristic of the hypervisor, an interface between the orchestrator and the hypervisor based on the indication of the characteristic of the hypervisor; and
establishing, based on the interface, a communication between the orchestrator and the hypervisor.

10. The method of claim 1, further comprising:
starting, by the target virtual machine, the first operating system from the second filesystem.

11. The method of claim 1, further comprising:
updating the second filesystem by performing at least one of:
  changing a networking configuration to remove a static network address;
  changing a first device driver to a second device driver operative to communicate with an environment of the target virtual machine; or
  changing a first configuration of the second filesystem to a second configuration of the second filesystem, wherein the first configuration of the second filesystem causes an error during a starting of the target virtual machine.

12. The method of claim 1, further comprising:
receiving, by the orchestrator via a user interface, an option; and
applying, by the orchestrator, the option,
wherein the option includes at least one of:
  a schedule operative to control a time of the receiving of the current state of the first filesystem of the source machine;
  a count operative to control a number of copies of the target virtual machine and the second filesystem;
  a subset operative to control a selection of the first filesystem included in the second filesystem; or
  a name operative to identify an image of the second filesystem created by the hypervisor.

13. The method of claim 1, further comprising:
determining a type of installation for the agent, wherein the type of installation includes at least one of:
  a manual installation process;
  an automated process initiated by the orchestrator; or
  an automated process initiated by a management server responsive to a signal from the orchestrator; and
installing the agent in accordance with the type of installation.

14. The method of claim 1, further comprising:
recording, by the agent, a timestamp corresponding to an initiation of a snapshot of the first filesystem;
creating, by the agent, a list of shadow blocks that are initially empty; and
starting, by the agent, a shadowing process operative to:
  determine, responsive to a modification of a block in the first filesystem, an absence of the block in the list of shadow blocks;
  copy, responsive to the determination, the block to a new shadow block; and
  add, responsive to the copying, the new shadow block to the list of shadow blocks.

15. The method of claim 1, further comprising:
executing, by the source machine, an application on the first operating system.

16. A system for generating virtual machines via a computer network, comprising:
a server comprising a processor;
an orchestrator executing on the processor of the server that transmits an agent for installation on a source machine, wherein the agent is configured to generate a snapshot of the source machine;
an interface of the orchestrator that receives, from the agent installed on the source machine, a current state of a first filesystem of the source machine, wherein the first filesystem includes a first configuration;
the orchestrator configures, on a hypervisor executing on a host machine, a second filesystem with a second configuration based on the first configuration;
the orchestrator initiates, on the hypervisor executing on the host machine, a transfer virtual machine using a default filesystem independent of the first configuration and the second configuration;
the orchestrator instructs, on the hypervisor executing on the host machine, the agent to directly transfer the snapshot of the source machine to the transfer virtual machine, wherein the transfer virtual machine is configured to write the second filesystem using the snapshot of the source machine;
the orchestrator updates, on the hypervisor executing on the host machine, the second filesystem written by the transfer virtual machine using the snapshot of the source machine to be operative to start a first operating system; and
the orchestrator creates, on the hypervisor executing on the host machine, a target virtual machine configured to launch the first operating system from the second filesystem, wherein the target virtual machine is different from the transfer virtual machine.

17. The system of claim 16, wherein the server is further configured to:
receive, by the transfer virtual machine responsive to the initiation, the snapshot of the source machine from the agent;
write, by the transfer virtual machine responsive to the reception of the snapshot of the source machine from the agent, the second filesystem using the snapshot of the source machine;
update, by the transfer virtual machine, the second filesystem to be operative to start the first operating system; and
launch, by the transfer virtual machine, the first operating system from the second filesystem.

18. The system of claim 16, wherein the server is further configured to:
initialize, by the hypervisor executing on the host machine, the default filesystem from a stored image; and
start, by the hypervisor executing on the host machine, the transfer virtual machine from the default filesystem, wherein the transfer virtual machine is configured to execute a second operating system different from the first operating system.

19. The system of claim 16, wherein the server is further configured to:
receive, by the agent from the orchestrator, a network address of the transfer virtual machine and a token;

create, by the agent from the orchestrator, using the network address of the transfer virtual machine, a network connection to the transfer virtual machine;

transmit, by the agent from the orchestrator to the transfer virtual machine, using the network connection to the transfer virtual machine, the token to authenticate the network connection to the transfer virtual machine;

accept, by the transfer virtual machine responsive to transmitting the token, the network connection to the transfer virtual machine; and use, by the agent from the orchestrator, the network connection to the transfer virtual machine to directly transfer the snapshot of the source machine to the transfer virtual machine.

20. The system of claim 16, wherein the server is further configured to:

destroy, responsive to the transfer virtual machine writing the second filesystem, the transfer virtual machine; and destroy, after the transfer virtual machine is destroyed, the default filesystem.

21. The system of claim 16, wherein:

the target virtual machine is created on the hypervisor executing on the host machine.

22. The system of claim 16, wherein:

the source machine is selected from one of:
 a physical source machine; or
 a virtual source machine.

23. The system of claim 16, wherein the server is further configured to:

receive, by the orchestrator from the source machine, an indication of the first operating system;

select, by the orchestrator from the source machine responsive to the reception of the indication of the first operating system, the agent from a plurality of source agents based on the indication of the first operating system; and transmit, by the orchestrator from the source machine responsive to the selection, the agent to the source machine.

24. The system of claim 16, wherein the server is further configured to:

receive, by the orchestrator from the hypervisor, an indication of a characteristic of the hypervisor;

select, by the orchestrator from the hypervisor responsive to the reception of the indication of the characteristic of the hypervisor, an interface between the orchestrator and the hypervisor based on the indication of the characteristic of the hypervisor; and establish, based on the interface, a communication between the orchestrator and the hypervisor.

25. The system of claim 16, wherein the server is further configured to:

start, by the target virtual machine, the first operating system from the second filesystem.

26. The system of claim 16, wherein the server is further configured to:

update the second filesystem by performing at least one of:

changing a networking configuration to remove a static network address;

changing a first device driver to a second device driver operative to communicate with an environment of the target virtual machine; or changing a first configuration of the second filesystem to a second configuration of the second filesystem, wherein the first configuration of the second filesystem causes an error during a starting of the target virtual machine.

27. The system of claim 16, wherein the server is further configured to:

receive, by the orchestrator via a user interface, an option; and apply, by the orchestrator, the option, wherein the option includes at least one of:

a schedule operative to control a time of the receiving of the current state of the first filesystem of the source machine;

a count operative to control a number of copies of the target virtual machine and the second filesystem;

a subset operative to control a selection of the first filesystem included in the second filesystem; or a name operative to identify an image of the second filesystem created by the hypervisor.

28. The system of claim 16, wherein the server is further configured to:

determine a type of installation for the agent, wherein the type of installation includes at least one of:

a manual installation process;

an automated process initiated by the orchestrator; or an automated process initiated by a management server responsive to a signal from the orchestrator; and install the agent in accordance with the type of installation.

29. The system of claim 16, wherein the server is further configured to:

record, by the agent, a timestamp corresponding to an initiation of a snapshot of the first filesystem;

create, by the agent, a list of shadow blocks that are initially empty; and start, by the agent, a shadowing process operative to:

determine, responsive to a modification of a block in the first filesystem, an absence of the block in the list of shadow blocks;

copy, responsive to the determination, the block to a new shadow block; and add, responsive to the copying, the new shadow block to the list of shadow blocks.

30. The system of claim 16, wherein the server is further configured to:

execute, by the source machine, an application on the first operating system.

\* \* \* \* \*